US010843412B2

(12) United States Patent
Van Espen

(10) Patent No.: US 10,843,412 B2
(45) Date of Patent: Nov. 24, 2020

(54) SUPPORT STRUCTURES IN ADDITIVE MANUFACTURING

(71) Applicant: MATERIALISE N.V., Leuven (BE)

(72) Inventor: Jan Van Espen, Leuven (BE)

(73) Assignee: Materialise N.V., Leuven (BE)

( * ) Notice: Subject to any disclaimer, the term of this patent is extended or adjusted under 35 U.S.C. 154(b) by 233 days.

(21) Appl. No.: 15/563,220

(22) PCT Filed: Apr. 1, 2016

(86) PCT No.: PCT/US2016/025538
§ 371 (c)(1),
(2) Date: Sep. 29, 2017

(87) PCT Pub. No.: WO2016/161276
PCT Pub. Date: Oct. 6, 2016

(65) Prior Publication Data
US 2018/0086004 A1 Mar. 29, 2018

Related U.S. Application Data

(60) Provisional application No. 62/142,695, filed on Apr. 3, 2015.

(51) Int. Cl.
*B29C 64/40* (2017.01)
*B33Y 40/00* (2020.01)
*B33Y 10/00* (2015.01)
*B33Y 30/00* (2015.01)
*B33Y 50/02* (2015.01)
*B29C 64/393* (2017.01)

(52) U.S. Cl.
CPC ............ *B29C 64/40* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC ...... B29C 64/40; B29C 67/0092; B33Y 40/00
See application file for complete search history.

(56) References Cited

U.S. PATENT DOCUMENTS 6,367,791 B1 * 4/2002 Calderon .............. B29C 64/118
269/291
9,993,973 B1 * 6/2018 Barnhart ............. B29C 67/0051
(Continued)

FOREIGN PATENT DOCUMENTS

CN 101918198 A 12/2010
CN 102164696 A 8/2011
(Continued)

OTHER PUBLICATIONS

Machine Translation JPH0584834 (Year: 1993).*
(Continued)

*Primary Examiner* — Matthew J Daniels
*Assistant Examiner* — Wayne K. Swier
(74) *Attorney, Agent, or Firm* — Patterson + Sheridan, LLP

(57) ABSTRACT

Embodiments of the present invention may relate to supports and methods of manufacturing such supports that reduce the complexity of removing the supports from the object and/or a base plate. In some embodiments, the present invention relates to base plates and methods of manufacturing base plates that reduce the complexity of removing supports from the base plate.

21 Claims, 14 Drawing Sheets

(56) References Cited

U.S. PATENT DOCUMENTS

| | | | | |
|---|---|---|---|---|
| 2009/0020901 | A1* | 1/2009 | Schillen | B29C 64/153 |
| | | | | 264/31 |
| 2011/0291331 | A1* | 12/2011 | Scott | B33Y 40/00 |
| | | | | 264/510 |
| 2013/0108726 | A1* | 5/2013 | Uckelmann | B33Y 50/02 |
| | | | | 425/174.4 |
| 2014/0300017 | A1* | 10/2014 | Wighton | B29C 64/141 |
| | | | | 264/40.1 |
| 2014/0333011 | A1* | 11/2014 | Javidan | B29C 64/118 |
| | | | | 264/401 |
| 2015/0077215 | A1* | 3/2015 | Ranky | H05K 3/1258 |
| | | | | 338/47 |
| 2016/0175932 | A1* | 6/2016 | Dimter | B22F 3/24 |
| | | | | 419/28 |
| 2016/0193785 | A1* | 7/2016 | Bell | B29C 64/118 |
| | | | | 264/255 |

FOREIGN PATENT DOCUMENTS

| | | | |
|---|---|---|---|
| JP | H0584834 | A | 4/1993 |
| JP | H0584834 | U * | 11/1993 |
| JP | 2 920008 | B2 | 7/1999 |
| WO | 2015/019070 | A1 | 2/2015 |

OTHER PUBLICATIONS

Machine Translation JPH0584834A (Year: 1993).*
International Search Report and Written Opinion issued in corresponding PCT/US2016/025538, dated Jun. 27, 2016.

* cited by examiner

SUPPORT STRUCTURES IN ADDITIVE MANUFACTURING

CROSS-REFERENCE TO RELATED APPLICATION

This application claims priority to U.S. Provisional Patent Application No. 62/142,695, filed Apr. 3, 2015, the entire contents of which are hereby incorporated by reference.

BACKGROUND OF THE INVENTION

The present application relates generally to additive manufacturing (e.g., three dimensional printing) techniques. In particular, this application relates to supporting structures used in additive manufacturing techniques.

Additive manufacturing techniques using an energy source to process raw building materials tend to create thermal and mechanical stresses and strains during the manufacturing process. These stresses and strains may, for example, be caused by the heating and cooling of the raw building materials, which leads to expansion and shrinkage of the material during manufacturing. For example, high stresses and strains may occur when manufacturing parts out of metal and metal powders using a laser or other energy source. The stresses and strains on the object, during or after manufacturing can deform the object, or during manufacturing can even prevent the build process from continuing.

Supports may be used to support the object being manufactured during the manufacturing process. These supports may directly contact the object and may prevent stresses and strains from deforming or distorting the object, act as a heat sink, and/or provide vertical support (e.g., against gravity) to keep the object in a particular position. However, these supports may increase the time and cost of manufacturing due to the extra post-processing necessary to remove the supports.

Accordingly, there is a need for improved supporting structures for supporting objects during additive manufacturing.

SUMMARY

In one embodiment, a method of manufacturing an object using additive manufacturing techniques is provided. The method comprises providing a support for the object, the support being configured to at least partially support the object during additive manufacturing of the object. The method further comprises providing a base plate, wherein the support is configured to couple at a first end with a first portion of the object and to couple at a second end with one of a second portion of the object, the base plate, and another object. The method further comprises providing, on at least one of the support and the base plate, a torque application portion configured to allow a rotational force to be applied to break at least a portion of the support from at least one of the object, the other object, and the base plate.

In one embodiment, a method of manufacturing an object using additive manufacturing techniques is provided. The method comprises providing a support for the object, the support being configured to at least partially support the object during additive manufacture of the object. The method further comprises providing a base plate, wherein the support is configured to couple at a first end with a first portion of the object and to couple at a second end with one of a second portion of the object, the base plate, and another object. The method further comprises providing, on at least one of the support and the base plate, a first portion of a coupling element, the coupling element comprising the first portion of the coupling element and a second portion of the coupling element, wherein the first portion of the coupling element is configured to detachably couple to the second portion of the coupling element. The method further comprises providing, on at least one of the support and the base plate, the second portion of the coupling element.

DETAILED DESCRIPTION OF CERTAIN INVENTIVE EMBODIMENTS

Figure 1:
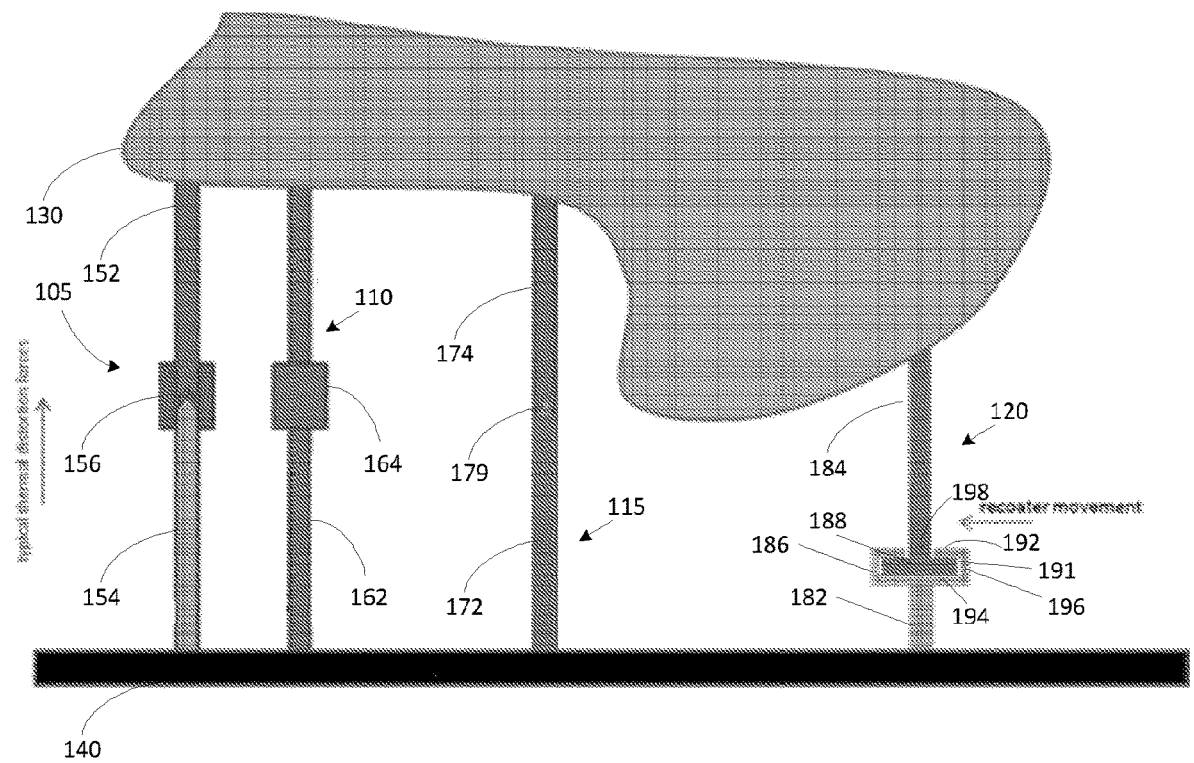
FIG. 1 illustrates various examples of supports as described herein.

The following description and the accompanying figures are directed to certain specific embodiments. The embodiments described in any particular context are not intended to limit this disclosure to the specified embodiment or to any particular usage. Those of skill in the art will recognize that the disclosed embodiments, aspects, and/or features are not limited to any particular embodiments.

Additive Manufacturing Techniques

The systems and methods described herein may be performed using various additive manufacturing and/or three-dimensional (3D) printing systems and techniques. Typically, additive manufacturing techniques start from a digital representation of the 3D object to be formed. Generally, the digital representation is divided into a series of cross-sectional layers, or "slices," which are overlaid to form the object as a whole. The layers represent the 3D object, and may be generated using additive manufacturing modeling software executed by a computing device. For example, the software may include computer aided design and manufacturing (CAD/CAM) software. Information about the cross-sectional layers of the 3D object may be stored as cross-sectional data. An additive manufacturing (e.g., 3D printing) machine or system utilizes the cross-sectional data for the purpose of building the 3D object on a layer by layer basis. Accordingly, additive manufacturing allows for fabrication of 3D objects directly from computer generated data of the objects, such as computer aided design (CAD) files. Additive manufacturing provides the ability to quickly manufacture both simple and complex parts without tooling and without the need for assembly of different parts.

Stereolithography (SLA) is an additive manufacturing technique used for "printing" 3D objects one layer at a time. An SLA apparatus may employ, for example, a laser to cure a photo-reactive substance with emitted radiation. In some embodiments, the SLA apparatus directs the laser across a surface of a photo-reactive substance, such as, for example, a curable photopolymer ("resin"), in order to build an object one layer at a time. For each layer, the laser beam traces a cross-section of the object on the surface of the liquid resin, which cures and solidifies the cross-section and joins it to the layer below. After a layer has been completed, the SLA apparatus lowers a manufacturing platform by a distance equal to the thickness of a single layer and then deposits a new surface of uncured resin (or like photo-reactive material) on the previous layer. On this surface, a new pattern is traced thereby forming a new layer. By repeating this process one layer at a time, a complete 3D part may be formed.

Selective laser sintering (LS) is another additive manufacturing technique used for 3D printing objects. LS apparatuses often use a high-powered laser (e.g. a carbon dioxide laser) to "sinter" (i.e. fuse) small particles of plastic, metal, ceramic, or glass powders into a 3D object. Similar to SLA, the LS apparatus may use a laser to scan cross-sections on the surface of a powder bed in accordance with a CAD design. Also similar to SLA, the LS apparatus may lower a manufacturing platform by one layer thickness after a layer has been completed and add a new layer of material in order that a new layer can be formed. In some embodiments, an LS apparatus may preheat the powder in order to make it easier for the laser to raise the temperature during the sintering process.

Selective Laser Melting (LM) is yet another additive manufacturing technique used for 3D printing objects Like LS, an LM apparatus typically uses a high-powered laser to selectively melt thin layers of metal powder to form solid metal objects. While similar, LM differs from LS because it typically uses materials with much higher melting points. When constructing objects using LM, thin layers of metal powder may be distributed using various coating mechanisms. Like SLA and LS, a manufacturing surface moves up and down to allow layers to be formed individually.

Fused Deposition Modeling (FDM) is another additive manufacturing technique wherein a 3D object is produced by extruding small beads of, for example, thermoplastic material from an extrusion nozzle to form layers. In a typical arrangement, the extrusion nozzle is heated to melt the raw material as it is extruded. The raw material then hardens immediately after extrusion from a nozzle. The extrusion nozzle can be moved in one or more dimensions by way of appropriate machinery. Similar to the aforementioned additive manufacturing techniques, the extrusion nozzle follows a path controlled by CAD or CAM software. Also similar, the part is built from the bottom up, one layer at a time.

Electron beam melting (EBM) and direct metal laser sintering (DMLS) are other examples of additive manufacturing techniques for 3D printing objects.

Objects may be formed by additive manufacturing apparatuses using various materials, such as (but not limited to): polypropylene, thermoplastic polyurethane, polyurethane, acrylonitrile butadiene styrene (ABS), polycarbonate (PC), PC-ABS, PLA, polystyrene, lignin, polyamide, polyamide with additives such as glass or metal particles, methyl methacrylate-acrylonitrile-butadiene-styrene copolymer, resorbable materials such as polymer-ceramic composites, and other similar suitable materials. In some embodiments, commercially available materials may be utilized. These materials may include: DSM Somos® series of materials 7100, 8100, 9100, 9420, 10100, 11100, 12110, 14120 and 15100 from DSM Somos; ABSplus-P430, ABSi, ABS-ESDI, ABS-M30, ABS-M30i, PC-ABS, PC-ISO, PC, ULTEM 9085, PPSF and PPSU materials from Stratasys; Accura Plastic, DuraForm, CastForm, Laserform and VisiJet line of materials from 3D-Systems; Aluminium, CobaltChrome and Stainless Steel materials; Maraging Steel; Nickel Alloy; Titanium; the PA line of materials, PrimeCast and PrimePart materials and Alumide and CarbonMide from EOS GmbH.

Objects formed using the additive manufacturing techniques described above have a tendency to distort from the designed dimensions of the object due to, for example, high stresses and/or strains that occur during the manufacturing of the 3D object. For example, thermal and/or mechanical stresses and/or strains may occur during an LM process due to a high temperature of an energy source, such as a laser, used in generating the 3D object. More particularly, high temperature gradients may be present due to the melting of the powders used in the LM process, such as metal alloy powders, and these high gradients may cause thermal stresses and/or strains on the object during manufacturing. Furthermore, internal mechanical stresses and/or strains may be caused due to properties of the particular material being used. These mechanical stresses and/or strains may include, for example, shrinking or expansion of the material used to form the object as the material is scanned by the energy source.

High stresses and/or strains on the object may cause certain portions of the object to deform during the build, which may result in a failed or "crashed" build, or an inaccurate and/or defective object. For example, a powder coater in an LM machine may hit a deformed portion of an underlying layer of an object being manufactured if that portion bent or curled upward or sidewards during the processing of any of the layers.

Object Supports Used During Additive Manufacturing

Object supports (also referred to herein as "supports") may be used to keep an object or part of an object in place and to prevent deformations of the object during the build process. Generally an "object support" is a structure that forms a connection between, for example, a base plate, an internal object structure (e.g., another portion of the object), or an external object structure (e.g., another object being manufactured during the same build process as the object), and the object being manufactured. Object supports may be virtually any shape and size that can be manufactured along with the object. And a given object may be supported during additive manufacturing by a variety of different shapes and sizes of object support based on the object design and the selected additive manufacturing process. For example, U.S. Provisional Patent Application 61/816,313 and PCT Patent Application No. PCT/EP2014/058484, the contents of each of which are incorporated by reference herein in their entirety, describe the use of "hybrid supports" that can be used during additive manufacturing processes.

Object supports may improve the accuracy of the resulting object after additive manufacturing by constraining each layer to its designed dimensions. Additionally, object supports may conduct heat away from the object layer and into a support structure and/or base plate in order to reduce thermal stresses and strains caused by the additive manufacturing process.

However, in order to complete the manufacturing of the object, the supports typically need to be removed from the object. The process for removing the supports can be time consuming and difficult. In particular, comparative processes to those described herein for removing the supports include using a bandsaw, wire cutting machine (such as EDM technology) pincer, hammer and chisel to break the supports from the object. Such breaking of the supports may require a large force applied to the support from the pincer, hammer and chisel and also require precision.

Similarly, the supports may need to be removed from the base plate used to build the object on. In particular, the base plate may be reusable for building different objects after the supports are removed. Removing the supports from the base plate, and reconditioning the base plate for reuse, may also be costly using comparative processes.

Accordingly, embodiments of the present invention may relate to supports and methods of manufacturing such supports that reduce the complexity of removing the supports from the object and/or the base plate. In some embodiments, the present invention relates to base plates and methods of manufacturing base plates that reduce the complexity of removing supports from the base plate.

In some embodiments, supports as described herein may include two portions (e.g., a first portion and a second portion) that are detachably coupled to each other by a detachable coupling mechanism (e.g., a screw mechanism, a latch mechanism, a slide fit mechanism, etc.). The detachable coupling mechanism may allow the first portion of the support and the second portion of the support to be detached from each other with relative ease. In some examples, the first portion of the support may be attached to the object, and the second portion of the support may be attached to either the base plate, another portion of the object (such as in a different plane horizontally), or another object being built during the same build process as the object (such as where multiple objects are built during a single 3D printing run). The first portion of the support may include a first portion of the coupling mechanism and the second portion of the support may include a second portion of the coupling mechanism. The first portion of the coupling mechanism and second portion of the coupling mechanism may directly couple with each other, such as where the coupling mechanism includes a latch or some other mechanism with a male and female connector coupling. In some embodiments, the coupling mechanism is a sliding mechanism where a first portion of the coupling mechanism slides into the second portion of the coupling mechanism. The sliding coupling mechanism may allow the supports to move relative to each other in one direction (e.g., horizontal direction with respect to the building of the object), while preventing movement in another direction (e.g., vertical direction with respect to the building of the object).

In some other embodiments, the first portion of the coupling mechanism and second portion of the coupling mechanism may couple with each other, via a third portion of the coupling mechanism. For example, the coupling mechanism may be a set of threads (e.g., screw threads) formed on a generally cylindrical support. The threads may be present on both the first portion and the second portion of the support and the two portions may be separate. The third portion of the coupling mechanism may be a device with complementary threads (e.g., nut) to the first portion and second portion of the support that screws around the first portion and the second portion of the support. The third portion of the coupling mechanism may be sized to simultaneously surround both some of the threads of the first portion and the second portion of the support so as to hold them together. The third portion of the coupling mechanism may be rotated (e.g., screwed) up and down to surround for example only one of the portions of the support so as to separate the portions of the support.

In some other embodiments, supports as described herein may include a support with an element (a torque application portion) that allows for rotational force to be applied to the support. For example, the torque application portion may resemble a nut formed on the support that has a shape (e.g., hexagon, square, etc.) that is complementary to a wrench. A wrench may then be used to interact with the torque application portion so as to apply rotational force to the support. The rotational force, as the inventor has discovered, more easily breaks the support from the object and/or base plate it is connected to. In some examples, the torque application portion comprises a hole formed in the support. An object, like a metal pin, can then be inserted in the hole and turned to apply rotational force to the support. In some embodiments, certain portions of the support may be weakened (e.g., made of less material), such that application of force to the torque application portion causes the support to more easily break at the weakened portion of the support.

In some embodiments, base plates as described herein may include a body portion and inserts that fit into the body portion of the base plate. Supports may be configured to attach to the inserts as opposed to the body portion of the base plate. For example, the inserts may include a torque application portion (similar to as described with respect to the supports) and the body portion may include a number of recesses that are shaped to receive the inserts. The support may be removed from the body portion by applying a rotational force to the torque application portion of the insert. For example, the inserts may comprise a bolt or screw like element, with a head that has a shape (e.g., hexagon, square, etc.) that is complementary to a wrench. The body portion may have a number of holes through the base plate that allow for the inserts to fit into the body portion. In some embodiments, the inserts and the body portion include complimentary threads on each so the inserts can be screwed into the body portion to keep them from falling out during movement.

In some other embodiments, the inserts may be part of a sliding mechanism where the insert is a first portion of the sliding mechanism that slides into the body of the base plate that includes a second portion of the sliding mechanism that is shaped complimentary to the insert so as to receive the insert. The sliding mechanism may allow the insert to move in one direction (e.g., horizontal direction with respect to the building of the object, such as rectilinearly or rotationally), while preventing movement in another direction (e.g., vertical direction with respect to the building of the object). For example, the insert may have a shape, (such as a trapezoid)

and the body portion of the build plate may have a whole or cut in with a similar shape that receives the insert.

Figure 3:
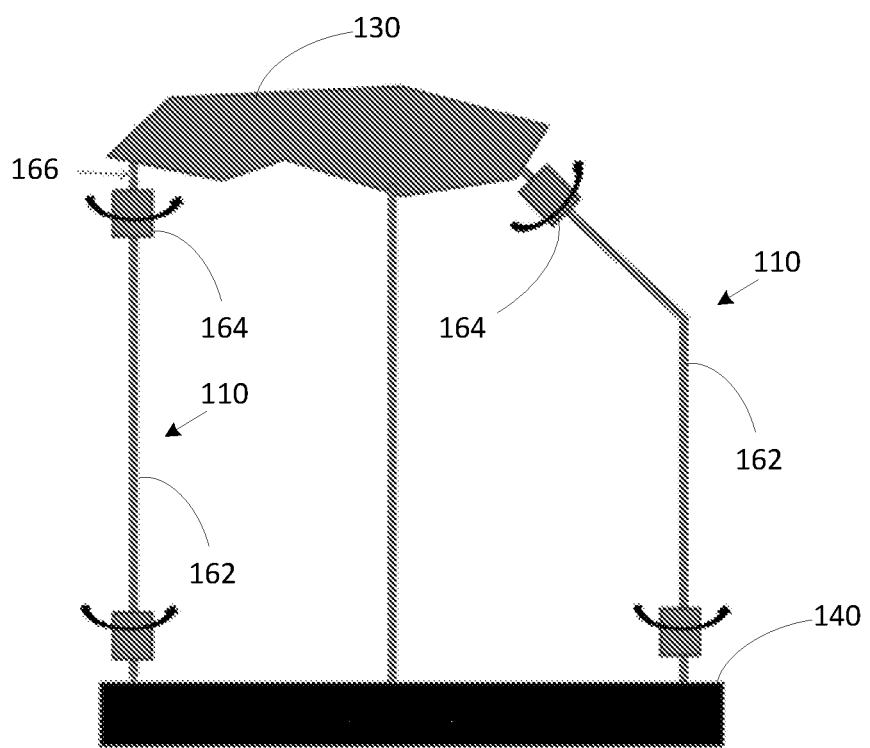
FIG. 3 illustrates an example of a torque application support of an embodiment of FIG. 1.

FIG. 1 illustrates various examples of supports as described herein. In particular, a first support 105, a second support 110, a third support 115, and a fourth support 120. Each of the supports 105-120 are shown as supporting the object 130 on the base plate 140. As illustrated in FIG. 1, each of the supports 105-120 are of a different type. Further, though the supports are shown as straight in FIG. 1, each may have an appropriate non-straight (e.g., angled, curved) shape, such as shown in FIG. 3. However, this may be for illustrative purposes only. In some examples, for a given build of a given process, only one type of support may be used.

As shown, the first support 105 is an example of what may be referred to generally as a detachably coupling type support, and more specifically as a threaded type support. The first support 105 includes a first portion 152 and a second portion 154. The first portion 152 and the second portion 154 may each have a substantially cylindrical shape. The diameter of each of the first portion 152 and the second portion 154 may be substantially equal. Further, the diameter of each may be different for different builds of different objects. For example, a fewer number of larger diameter supports may be used in some examples. In some examples, a greater number of smaller diameter supports may be used.

Each of the first portion 152 and the second portion 154 may have external (male) threads (similar to the threads of a screw) formed thereon. The direction of the threads (e.g., right-handed or left-handed) on each of the first portion 152 and the second portion 154 may be formed in some examples, in the same direction, or in some examples, in the opposite direction. The first portion 152 and the second portion 154 may be formed as separate portions during 3D printing. Accordingly, there may be a space formed between the first portion 152 and the second portion 154. In some embodiments, it may not be feasible to 3D print an actual space between the first portion 152 and the second portion 154. Accordingly, there may be some material connecting the first portion 152 and the second portion 154, however, that material may be minimized as physically possible by the 3D printer in order to reduce the force needed to separate the first portion 152 and the second portion 154.

Figure 2:
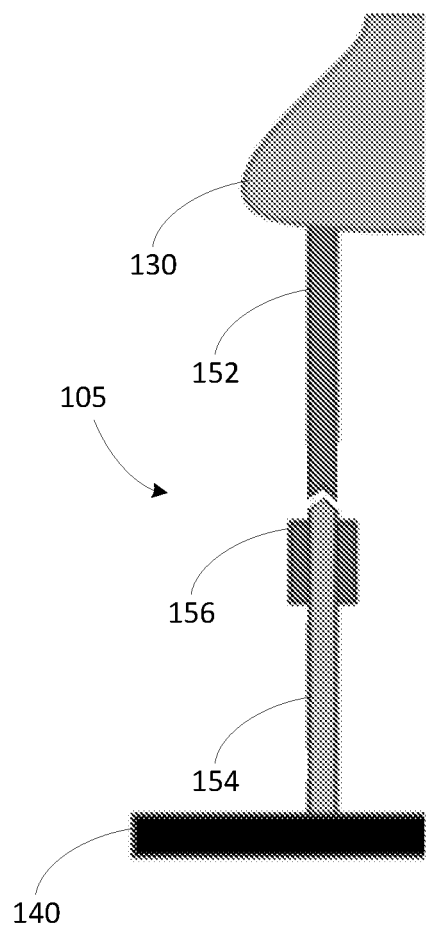
FIG. 2 illustrates an example of a decoupled detachably coupling type support of an embodiment of FIG. 1.

The first support 105 may further include a coupling portion 156. The coupling portion 156 may comprise a nut or nut-like component have internal (female) threads. The coupling portion 156 may have an internal passage-way (e.g., cavity) with the internal threads with a diameter similar to the first portion 152 and the second portion 154 so as to be able to receive and couple with the first portion 152 and the second portion 154. Accordingly, the threads of the coupling portion 156 may be complimentary to the threads of the first portion 152 and the second portion 154. The coupling portion 156 may be configured to engage both the first portion 152 and the second portion 154 as shown in FIG. 1 to hold both the first portion 152 and the second portion 154 together as shown. Further, the coupling portion 156, when rotated may slide up and down the first portion 152 and the second portion 154 due to the complimentary threads. Accordingly, the coupling portion 156 can move along the first portion 152 and the second portion 154 and disengage from at least one of the first portion 152 and the second portion 154 so that the portions are separate and the first support 105 decoupled into two parts as shown in FIG. 2. Accordingly, the coupling portion 156 detachably couples the first portion 152 to the second portion 154. The coupling portion 156, and the threads of the first portion 152 and the second portion 154 may collectively form a detachable coupling mechanism.

It should be noted that though the break between the first portion 152 and the second portion 154, and the coupling portion 156, are shown near the middle of the first support 105, in some embodiments, the break and coupling portion 156 may be anywhere along the first support 105. Further, there may be more than two separate portions of the first support 105, and accordingly, additional coupling portions to hold the separate portions together.

The coupling portion 156 may also be formed separate from the first portion 152 and the second portion 154 during 3D printing, however all the portions may be printed together in the engaged configuration during printing of the object. Accordingly, there may be a space formed between the threads of the coupling portion 156 and the threads of the first portion 152 and the second portion 154. In some embodiments, it may not be feasible to 3D print an actual space between the threads. Accordingly, there may be some material connecting the coupling portion 156 to the first portion 152 and the second portion 154, however, that material may be minimized as physically possible by the 3D printer in order to reduce the force needed to rotate and move the coupling portion 156 along the first portion 152 and the second portion 154.

As shown, the second support 110 is an example of what may be referred to as a torque application support. The second support 110 includes a body 162. The body 162 may have a substantially cylindrical, rectangular, or polygonal shape. The diameter of the body 162 may be different for different builds of different objects. For example, a fewer number of larger diameter supports may be used in some examples. In some examples, a greater number of smaller diameter supports may be used in some other examples.

The second support 110 further includes a torque application portion 164. The torque application portion, in this example, is formed on the body 162. The torque application portion 164 may be sized and shaped to allow a wrench, pliers, or other appropriate tool to surround or be inserted into the torque application portion 164 and apply a rotational force to the torque application portion 164. For example, the torque application portion 164 may have a hexagonal nut like shape, a rectangular shape, etc. In another example, the torque application portion may be a hole in the body 162 that is sized and shaped to allow a pen, screwdriver, or other appropriate tool to be inserted in the torque application portion and apply a rotational force to the torque application portion. For example, the torque application portion may have a circular shape, a hexagonal shape, a rectangular shape, etc. The torque application portion 164 and the body 162 may be formed as a single, joined component during 3D printing.

The body 162 may include on or more weakened points 166 as shown in FIG. 3. The weakened points 166 may be points where the diameter of the body 162 is substantially reduced, or portions of the material of the body 162 is removed (for example the weakened portion 166 may comprise a number of smaller supports than the body 162 spaced apart from each other). Accordingly, when a rotational force is applied to the torque application portion 164, which also imparts the rotational force on the body 162, the weakened points 166 may break before the rest of the body 162.

It should be noted that though the torque application portion 164 is shown near the middle of the body 162 of the second support 110, in some embodiments, the torque application portion 164 may be formed anywhere along the body 162. For example, the torque application portion 164 may be formed near a weakened point 166 as shown in FIG. 3. Further, there may be more than one torque application portion 164 formed on the body 162.

As shown, the third support 115 is an example of what may be referred to generally as a detachably coupling type support, and more specifically as a pin-hole application support. The third support 115 includes a first portion 172 and a second portion 174. The first portion 172 and the second portion 174 may each have a substantially cylindrical, rectangular, or polygonal shape. The diameter of each of the first portion 172 and the second portion 174 may be substantially equal. Further the diameter of each may be different for different builds of different objects. For example, a fewer number of larger diameter supports may be used in some examples. In some examples, a greater number of smaller diameter supports may be used.

Figure 4A:
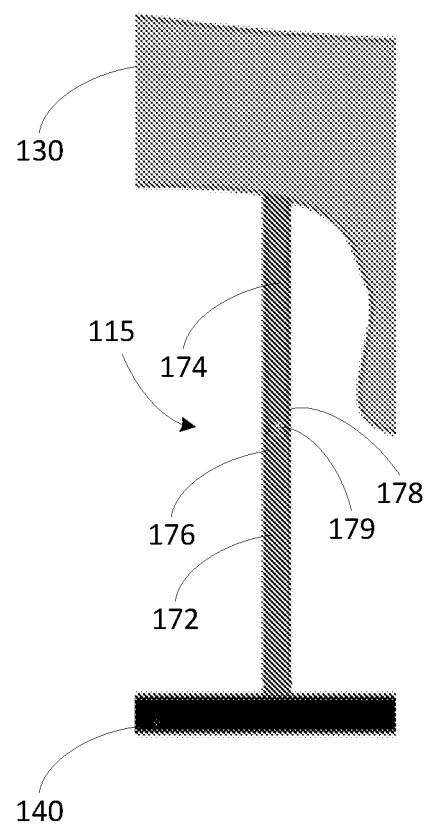
FIG. 4A illustrates an example of a coupled detachably coupling type support of an embodiment of FIG. 1.
Figure 4B:
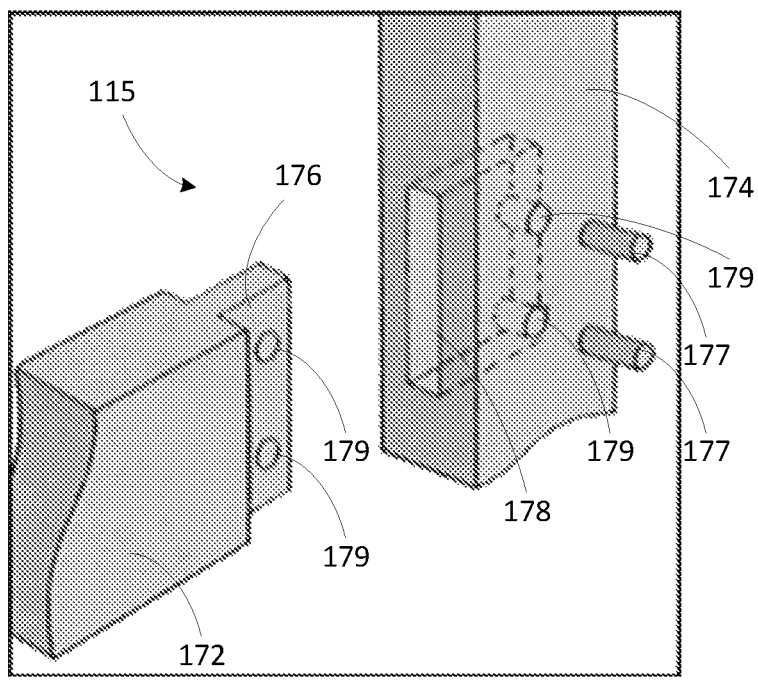
FIG. 4B illustrates an example of a coupling mechanism that may be used in conjunction with the detachably coupling type support of an embodiment of FIG. 4A.

The first portion 172 of the support may include a first part of a coupling mechanism 176 and the second portion of the support may include a second part of the coupling mechanism 178, as shown in FIGS. 4A and 4B. As shown, the first part of the coupling mechanism 176 and the second part of the coupling mechanism 178 each comprise one or more complimentary holes 179, which may have a circular shape, a hexagonal shape, a rectangular shape, etc. As shown in FIG. 4B, the first part of the coupling mechanism 176 and the second part of the coupling mechanism 178 may have complimentary shapes (e.g., male-female type connectors), so that the first part 176 is configured to slide into and engage the second part 178 (or vice-versa). In some embodiments, the first part 176 and second part 178 may be substantially prevented from movement in all directions except the direction in which the first part 176 is slid into the second part 178. Further, the first part 176 and second part 178 may be configured so that the holes 179 of each align when engaged. In addition, the third support 115 may comprise one or more pins 177, or other object configured to be inserted into the holes 179 to lock the first portion 172 and the second portion 174 to prevent movement between each other. The pins 177 may be removed to allow separation of the first portion 172 and the second portion 174.

The first portion 172, the second portion 174, and the pins 177, may be formed as separate portions during 3D printing, however all the portions may be printed together in the engaged configuration during printing of the object. Accordingly, there may be a space formed between the first portion 172, the second portion 174, and the pins 177. In some embodiments, it may not be feasible to 3D print an actual space between the first portion 172, the second portion 174, and the pins 177. Accordingly, there may be some material connecting the first portion 172, the second portion 174, and the pins 177, however, that material may be minimized as physically possible by the 3D printer in order to reduce the force needed to separate the first portion 172, the second portion 174, and the pins 177.

It should be noted that though the first part of the coupling mechanism 176 and the second part of the coupling mechanism 178 are shown near the middle of the third support 115, in some embodiments, the first part of the coupling mechanism 176 and the second part of the coupling mechanism 178 may be formed anywhere along the third support 115. Further, there may be more than two separate portions of the third support 115, and accordingly, additional coupling portions to hold the separate portions together.

Figure 5:
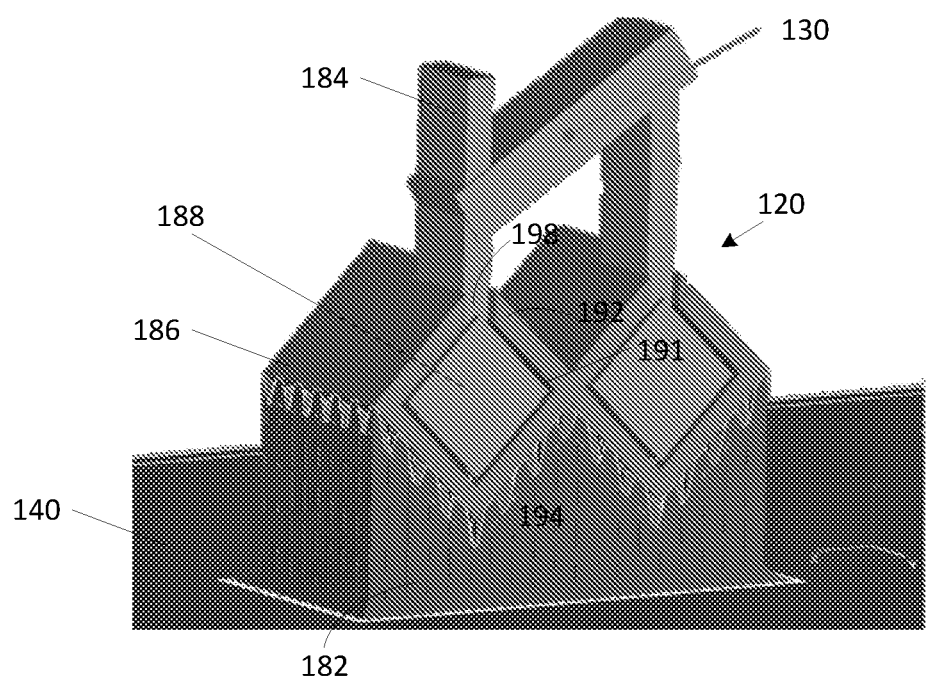
FIG. 5 illustrates an example of a sliding coupling type support of an embodiment of FIG. 1.

As shown, the fourth support 120 (also shown in FIG. 5) is an example of what may be referred to generally as a detachably coupling type support, and more specifically as a sliding coupling type support. The fourth support 120 includes a first portion 182 and a second portion 184. The first portion 182 and the second portion 184 may each have a substantially cylindrical, conical, rectangular, polygonal or any other regular or irregular shape. The diameter of each of the first portion 182 and the second portion 184 may be substantially equal. Further, the diameter of each may be different for different builds of different objects. For example, a fewer number of larger diameter supports may be used in some examples. In some other examples, a greater number of smaller diameter supports may be used.

The first portion 182 of the support may include a first part of a coupling mechanism 186 and the second portion 184 of the support may include a second part of the coupling mechanism 188. As shown, the first part of the coupling mechanism 186 includes a cavity 191 (e.g., hole) having walls surrounding the cavity 191. For example, the first part of the coupling mechanism 186 includes an upper wall 192, a lower wall 194, and side walls 196. The upper wall 192 may include an opening 198. The opening 198 as shown only extends part way along the cavity 191. However, in some examples, the opening 198 may extend fully along the cavity 191. The cavity 191 may be of any appropriate shape, such as rectangular, diamond shaped, circular, polygonal, etc. The first part of the coupling mechanism 186 may be formed on the end of the first portion 182.

The second part of the coupling mechanism 188 may be a solid shape configured to fit into the cavity 191 and having a complimentary shape thereto. For example, the second part of the coupling mechanism 188 may have a rectangular, diamond shaped, circular, polygonal, etc. The second part of the coupling mechanism 188 may be formed on the end of the second portion 184. The second part of the coupling mechanism 188 may be configured to slide into the cavity 191. Further, the remaining portion of the second portion 182 may be configured to extend through the opening 198. The upper wall 192 may prevent the second part of the coupling mechanism 188, and therefore the second portion 184, from moving in the direction of the upper wall 192 (e.g., vertically upward with respect to the build of the object). Similarly, the walls 194-196 prevent movement in their respective directions. Accordingly, when the second part of the coupling mechanism 188 is slid into the first part of the coupling mechanism 186, the first portion 182 and second portion 184 are coupled and cannot move with respect to each other, except for sliding in the direction of the cavity 191. The second part of the coupling mechanism 188 can then be slid out of the first part of the coupling mechanism 186, thus decoupling the first portion 182 and second portion 184 so they can move with respect to each other.

The first portion 182 and the second portion 184 may be formed as separate portions during 3D printing, however all the portions may be printed together in the engaged configuration during printing of the object. Accordingly, there may be a space formed between the first portion 182 and the second portion 184. In some embodiments, it may not be feasible to 3D print an actual space between the first portion 182 and the second portion 184. Accordingly, there may be some material connecting the first portion 182 and the second portion 184, however, that material may be minimized as physically possible by the 3D printer in order to reduce the force needed to separate the first portion 182 and the second portion 184.

It should be noted that though the first part of the coupling mechanism 186 and the second part of the coupling mechanism 188, are shown near the middle of the fourth support 120, in some embodiments, the first part of the coupling mechanism 186 and the second part of the coupling mechanism 188 may be anywhere along the fourth support 120. Further, there may be more than two separate portions of the fourth support 120, and accordingly, additional coupling portions to hold the separate portions together.

Figure 6A:
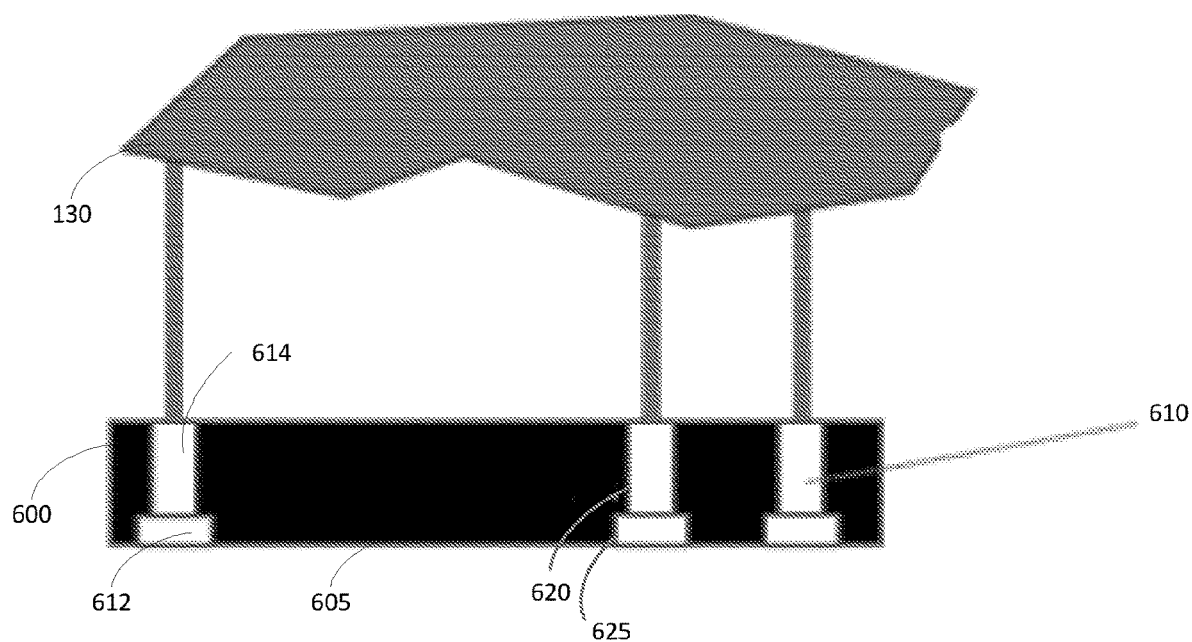
FIG. 6A illustrates an example of a base plate that includes a body portion and inserts.
Figure 6B:
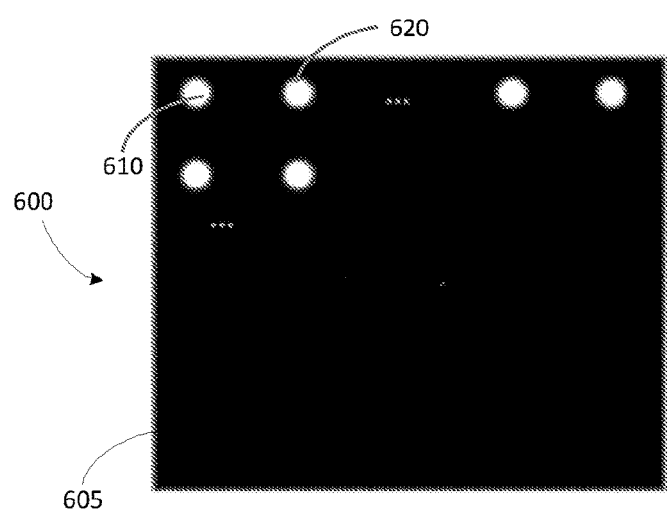
FIG. 6B is a top view of the base plate of FIG. 6A.

FIGS. 6A-6B illustrate an example of a base plate 600 that includes a body portion 605 and inserts 610 that fit into the body portion 605. In particular, the inserts 610 each include a torque application portion 612 and a shaft portion 614. As shown, the torque application portion 612 is at the end of each of the inserts 610. However, the torque application portion 612 may be placed anywhere along shaft portion 614 that is appropriate.

The torque application portion 612 may be sized and shaped to allow a wrench, pliers, or other appropriate tool to surround the torque application portion 612 and apply a rotational force to the torque application portion 612. For example, the torque application portion 612 may have a hexagonal nut like shape, a rectangular shape, etc. The torque application portion 612 and the shaft portion 614 may be formed as a single, joined component during 3D printing or other type of traditional manufacture. Alternatively, the torque application portion 612 and the shaft portion 614 may be formed separately and coupled using a coupling portion. In some implementations, the application portion 612 and the shaft portion 614 may include external threading which allows them to be joined using a cylindrical coupling portion having internal threading.

The shaft portion 614 may have a substantially cylindrical, rectangular, or polygonal shape. Similarly the body portion 605 may include a number of cavities 620 (e.g., holes) that have a substantially round shape and are sized complimentary to the diameter (e.g., approximately the same diameter) of the shaft portion 614 to allow the shaft portion 614 to fit into the cavity 620 and rotate.

In some examples, the shaft portion 614 may have external (male) threads (similar to the threads of a screw) formed thereon. Each of the inserts 610 may have the same direction of the threads (e.g., right-handed or left-handed) on its shaft portion 614. In such examples, the cavities 620 may have internal (female) threads complimentary to the threads of the shaft portion 614. Accordingly, the shaft portion 614 may be screwed into the cavities 620 to engage the inserts 610 with the body portion 605.

The body portion 605 may further have a cut-out 625 in each of the same area as the cavities 620 (e.g., along the same axis as the center of the cavities 620). The cut-outs 625 may also have a substantially circular or other appropriate shape. Each of the cut-outs 625 may have a diameter large enough to allow the torque application portion 612 to fit into the cut-out 625. The diameter may further be large enough to allow a tool to interact with the torque application portion 612 to apply a rotational force to the torque application portion 612. The depth of the cut-out 625 in the body portion 605 may be the same or greater than the depth of the torque application portion 612 (and any portion of the shaft portion 614 beyond the torque application portion 612) so as to prevent the insert 610 from protruding from the body portion 605 when the inserts 610 are inserted in the body portion 605. Accordingly, the cavity 620 may be formed along the remainder of the depth of the body portion 605. Further, the shaft portion 614 may be sized so that when the insert 610 is fully inserted into the body portion 605 it sits substantially flush with the body portion 605.

The body portion 605 and the inserts 610 may be formed prior to building (3D printing) an object. The inserts 610 may be inserted into the body portion 605, and the object built on top of the base plate 600. The supports (e.g., any support type, including traditional supports) may be fully or partially built on top of the portions of the inserts 610 that are exposed on top of the base plate 600. The supports may be built with or without one or more weakened points. After the object is built, torque can be applied (e.g., using an appropriate tool) to the torque application portion 612 of each insert 610 with a support built on it. Applying torque causes the insert 610 to rotate, and accordingly, the insert 610 may break from the support, or the support itself may rotate and break at another point, such as a weakened point along the support. Accordingly, the base plate 600 can easily be separated from the support. Further, in some examples, the inserts 610 can be replaced with new inserts 610 that are easily manufactured, and the base plate 600 reused without expensive reconditioning.

Figure 7A:
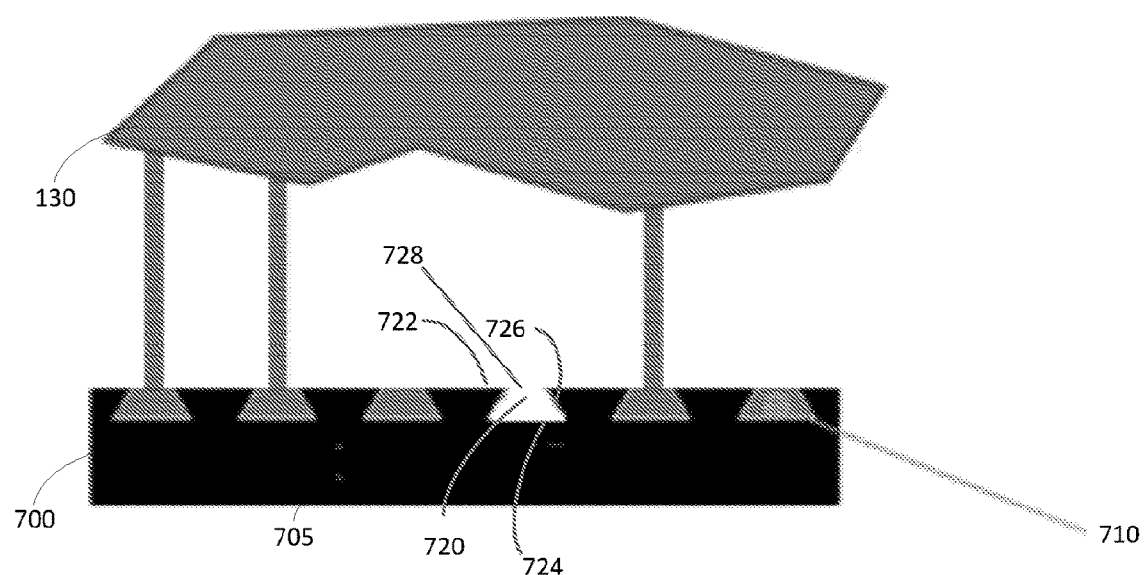
FIG. 7A illustrates another example of a base plate that includes a body portion and inserts.
Figure 7B:
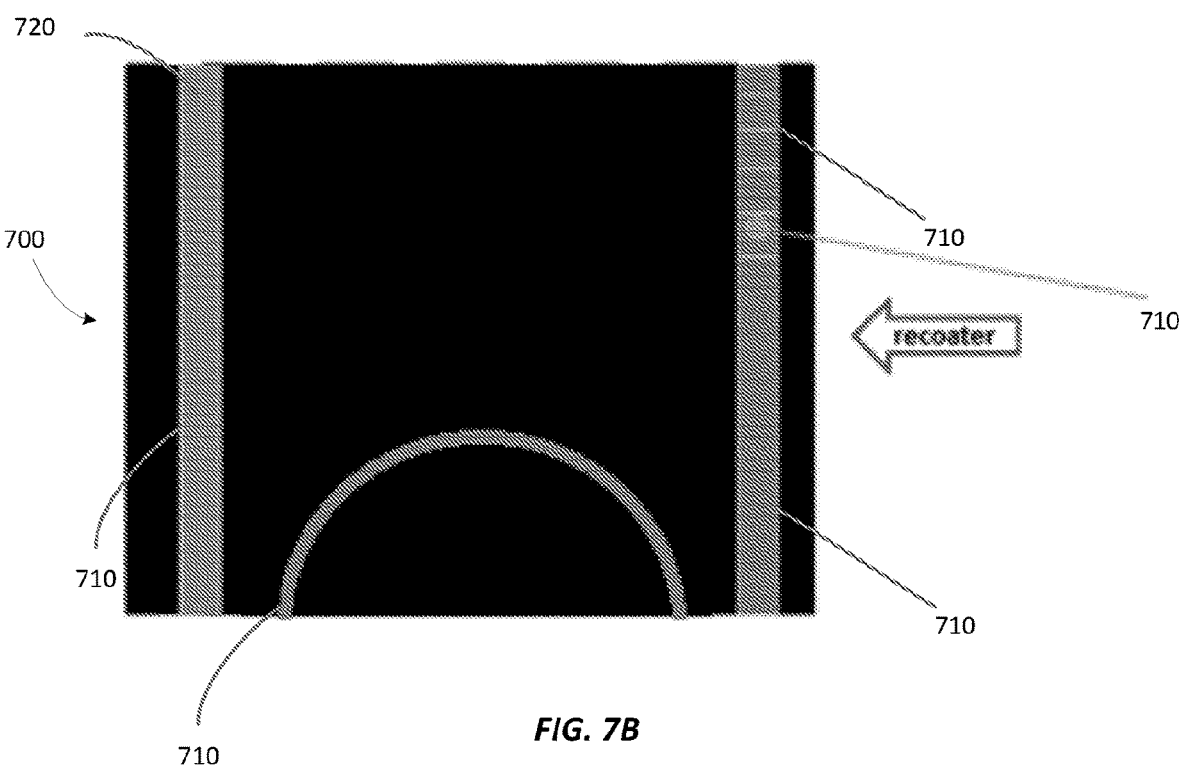
FIG. 7B illustrates a top view of another example of a base plate that includes a body portion and inserts.
Figure 7C:
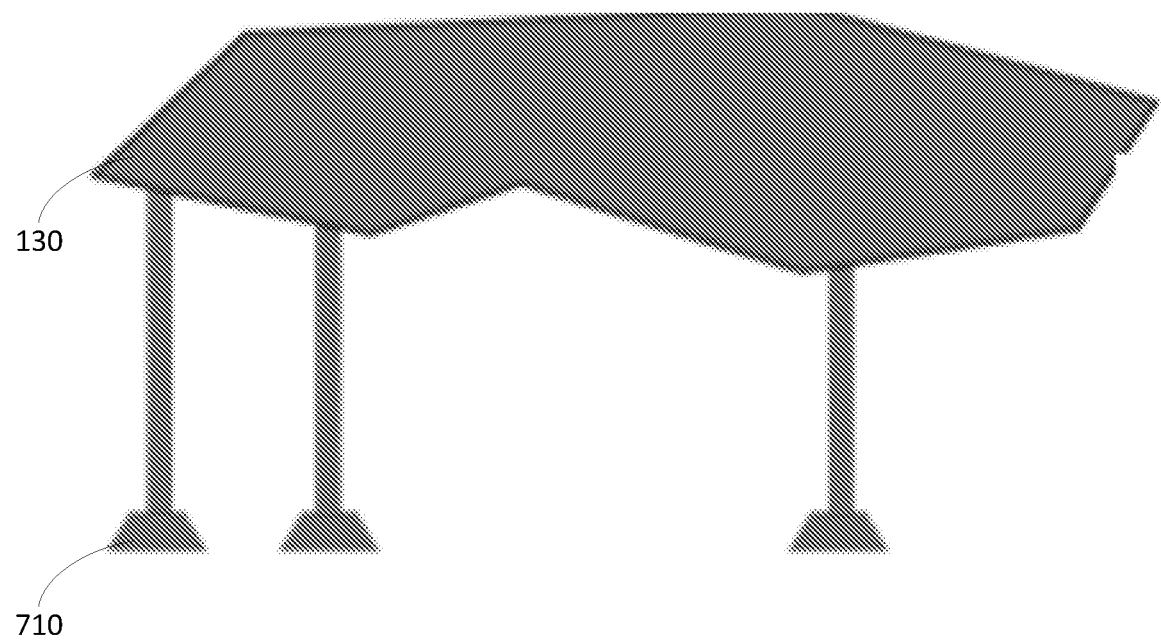
FIG. 7C illustrates separation of an object from the base plate of FIG. 7A.

FIGS. 7A-7C illustrates an example of a base plate 700 that includes a body portion 705 and inserts 710 that fit into the body portion 705. The inserts 710 may be formed as a solid body with a particular shape, such as, rectangular, diamond shaped, circular, polygonal, etc. For example, inserts 710 are shown as having a trapezoidal shape. The insert 710 as shown is a substantially straight block with a trapezoidal shape along the length of the block. It should be noted that the insert 710 may alternatively be a curved block (e.g., curved to as to be able to be rotated along an arc with a fixed radius) with a particular shape, such as shown in FIG. 7B.

The body portion 705 may include one or more cavities 720 (e.g., hole) having walls surrounding and defining the cavity 720. For example, each cavity 720 may be surrounded by an upper wall 722, a lower wall 724, and side walls 726. The upper wall 722 may include an opening 728 that exposes a top portion of an inserted insert 710. The cavity 720 may be of any appropriate shape, such as rectangular, diamond shaped, trapezoidal, circular, polygonal, etc., which is complimentary to the shape of the inserts 710 to be inserted in the cavity 720.

The inserts 710 and cavity 720 may be shaped and sized appropriately so that a top portion of the inserts 710 is substantially flush with the top of the body portion 705 when inserted into the cavity 720. In some examples, multiple smaller inserts 710 may be inserted into the same cavity 720 as shown in FIG. 7B. Accordingly, smaller amounts of material may need to be replaced when an insert 710 is replaced.

The insert 710 may be inserted in the cavity 720 by sliding the insert 720 (e.g., horizontally with respect to build of an object) into the cavity 720. The upper wall 722 may prevent the insert 710 from moving in the direction of the upper wall 722 (e.g., vertically upward with respect to the build of the object). Similarly, the walls 724-726 prevent movement in their respective directions. Accordingly, when insert 710 is slid (e.g., rectilinearly for a straight insert and rotationally for a curved insert) into the cavity 720 the insert 710 cannot move, except for sliding along the length of the cavity 720.

The body portion 705 and the inserts 710 may be formed prior to building (3D printing) an object. The inserts 710 may be inserted into the body portion 705, and the object built on top of the base plate 700. The supports (e.g., any support type, including traditional supports) may be built on top of the portions of the inserts 710 that are exposed on top of the base plate 700. The supports may be built with or without one or more weakened points. After the object is built, the inserts 710 with the attached supports can be slid out of the body portion 705 to disengage the object and supports from the body portion 705 as shown in FIG. 7C. Further, in some examples, the inserts 710 can be replaced with new inserts 710 that are easily manufactured, and the base plate 700 reused without expensive reconditioning.

Figure 8:
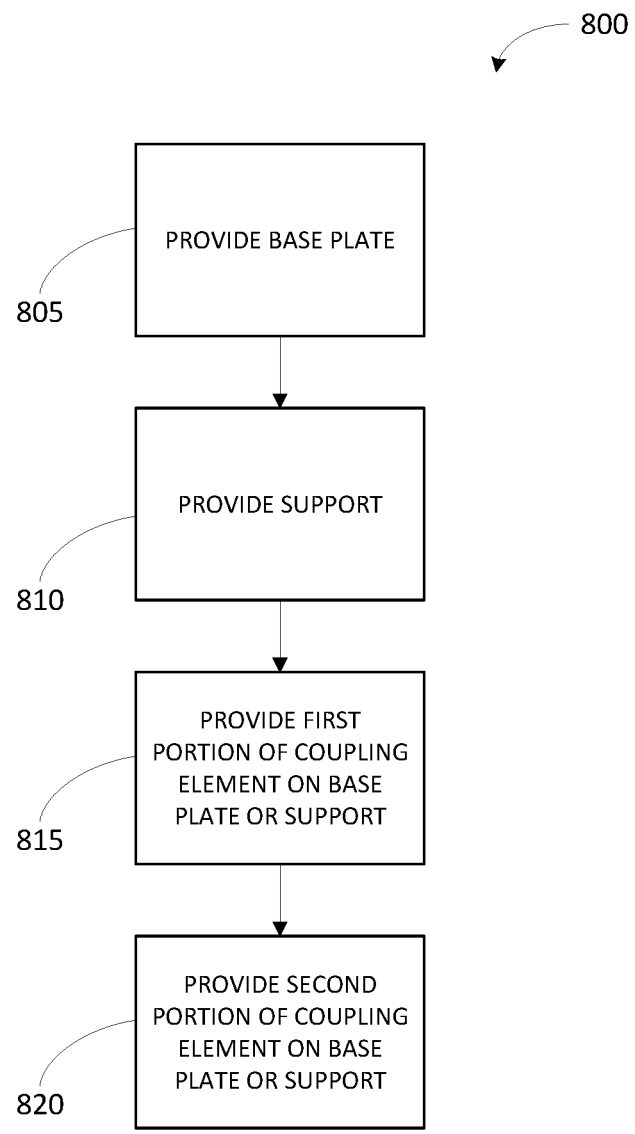
FIG. 8 depicts a flowchart of an example process for manufacturing an object using supports and base plates.

FIG. 8 is an example of a process 800 for manufacturing an object using supports and a base plate according to the examples described herein. At a block 805, a base plate is provided. Further, at a block 810, a support is provided for the object that at least partially supports the object. The support couples at a first end with a first portion of the object and couples at a second end with one of a second portion of the object, the base plate, and another object. Continuing, at a block 815, a first portion of a coupling element is provided on at least one of the support and the base plate. The coupling element may include the first portion of the coupling element, and a second portion of the coupling element. The first portion of the coupling element may detachably couple to the second portion of the coupling element. Further, at a block 820, the second portion of the coupling element is provided on the at least one of the support and the base plate.

Figure 9:
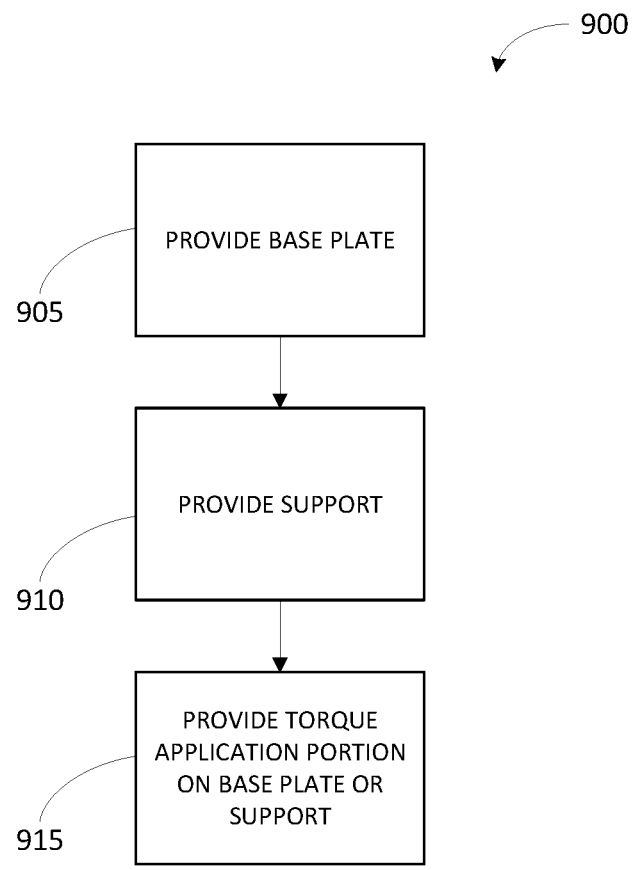
FIG. 9 depicts a flowchart of another example process for manufacturing an object using supports and base plates.

FIG. 9 is an example of a process 900 for manufacturing an object using supports and a base plate according to the examples described herein. At a block 905, a base plate is provided. Further, at a block 910, a support is provided for the object that at least partially supports the object. The support couples at a first end with a first portion of the object and couples at a second end with one of a second portion of the object, the base plate, and another object. Continuing, at a block 915, a torque application portion is provided on at least one of the support and the base plate. The torque application portion allows a rotational force to be applied to break at least a portion of the support from at least one of the object, the other object, and the base plate.

Figure 10:
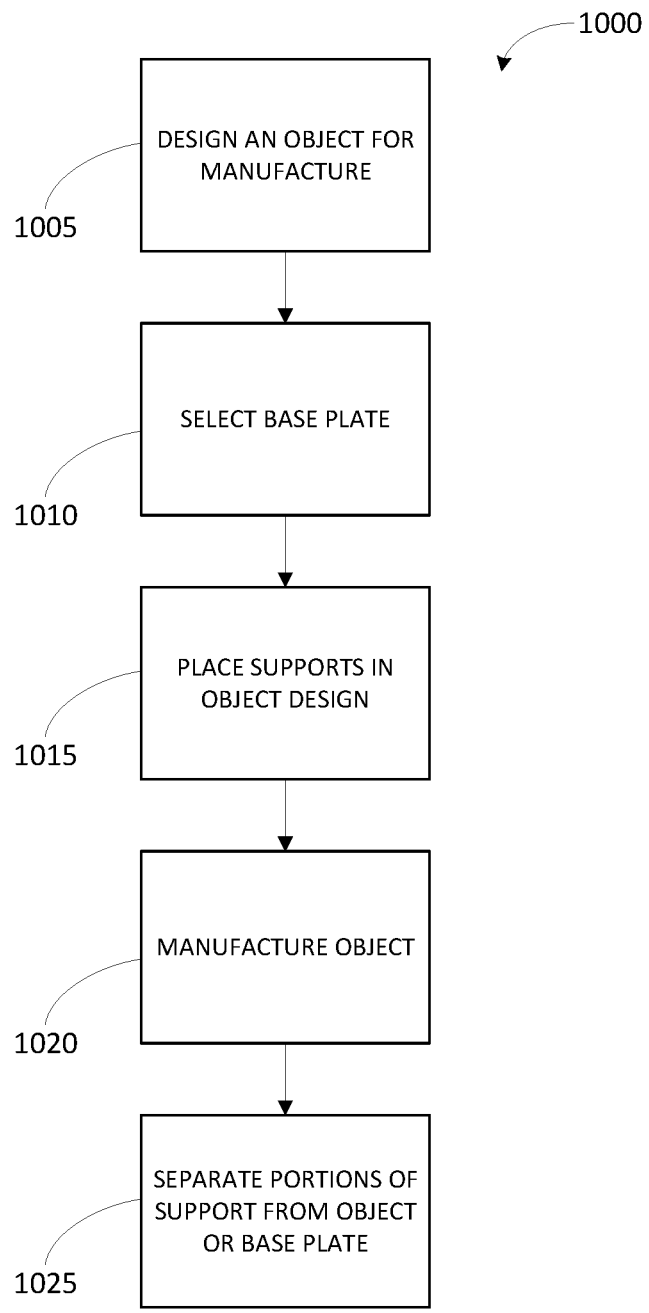
FIG. 10 depicts a flowchart of another example process for manufacturing an object using supports and base plates.

FIG. 10 is an example of a process 1000 for manufacturing an object using supports and a base plate according to the examples described herein. At a block 1005, an object for manufacture is designed. Further, at a block 1010, a base plate is selected to build the object on. The base plate may be any of the types described herein, or a standard base plate (depending on the types of supports used). Continuing, at a block 1015, supports are placed in the design of the object for use when building the object. The supports may be any of the types described herein, or standard supports (depending on the type of base plate used). Next, at a block 1020, the object is manufactured on the base plate with the supports as a single build using an additive manufacturing apparatus (e.g., 3D printer). Continuing, at the block 1025, portions of the supports are separated from at least one of the base plate and the object using the techniques described herein based on the type of support or base plate used (e.g., rotation applied to the support or insert, decoupling of portions of the support from each other, sliding of inserts out of the base plate, etc.).

It should be noted that other embodiments of the processes 800, 900, and 1000 may include additional blocks, remove blocks, may have blocks ordered in a different manner, or any combination thereof.

The embodiments described herein advantageously improve the manufacture of objects using additive manufacturing. In particular, the supports, base plates, and techniques allow for supports for objects to be removed quickly and efficiently.

Figure 11:
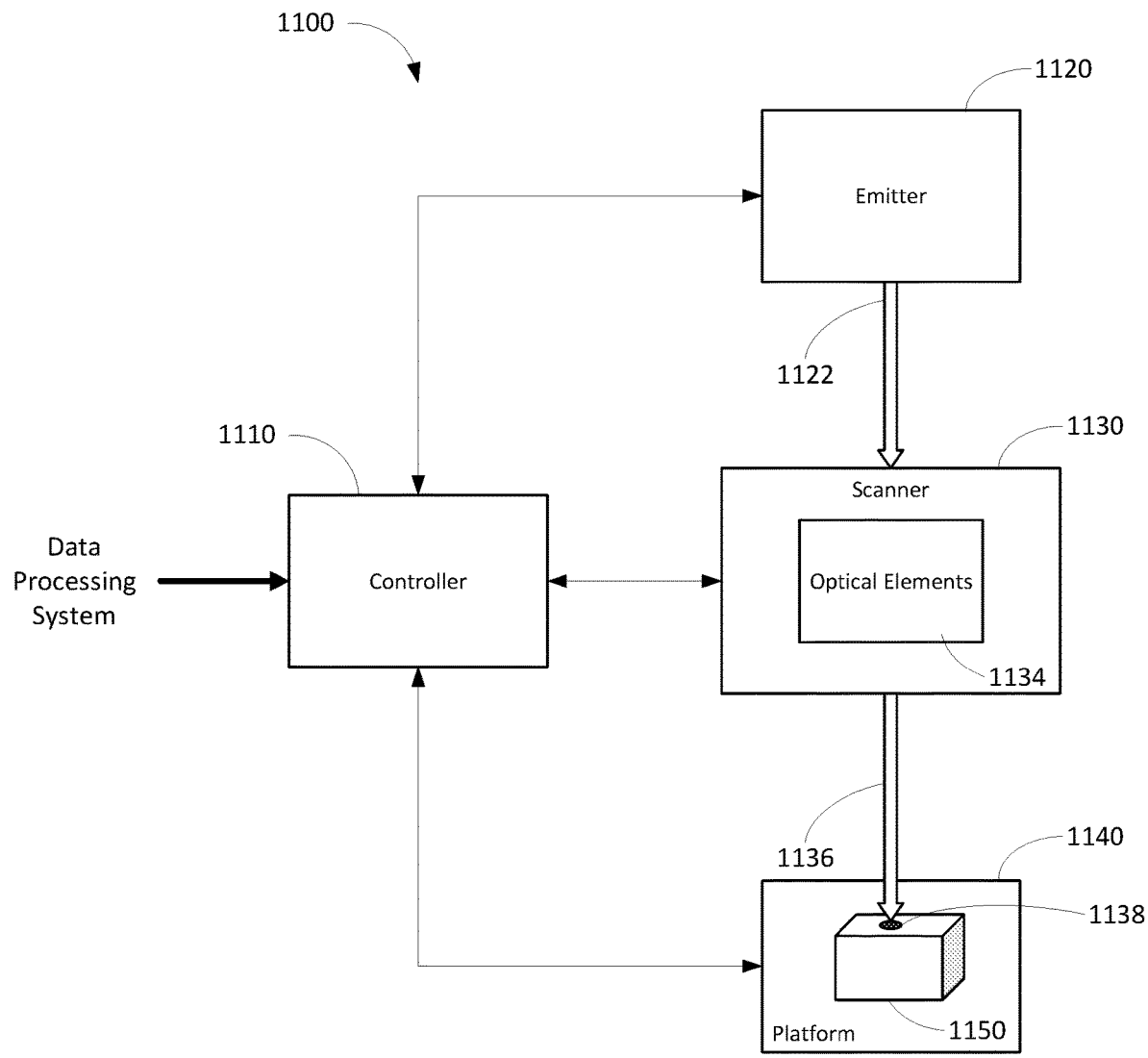
FIG. 11 depicts an exemplary additive manufacturing apparatus that may be configured to perform additive manufacturing techniques.

FIG. 11 depicts an exemplary additive manufacturing apparatus 1100 that may be configured to perform additive manufacturing techniques such as SLA, LS, DMLS, EBM and LM, and others as are known in the art, in order to manufacture objects with supports and/or base plates as described herein with respect to FIGS. 1-7, such as using the processes described with one or more of FIGS. 8-10, or other supports and/or base plates and processes according to one or more of the embodiments described herein.

Additive manufacturing apparatus 1100 includes a controller 1110, which is in data communication with an emitter 1120, a scanner 1130, and a platform 1140.

Controller 1110 may be, for example, a computer system with software for operating additive manufacturing apparatus 1100. In other embodiments, controller 1110 may be embodied as a general purpose processor, a digital signal processor (DSP), an application-specific integrated circuit (ASIC), a field-programmable gate array (FPGA) or other programmable logic device, discrete gate or transistor logic, discrete hardware components, or any suitable combination thereof designed to perform the functions described herein as are known by those of skill in the art.

The lines of data communication depicted between controller 1110 and emitter 1120, scanner 1130, and platform 1140 in FIG. 11 are representative only.

Controller 1110 may control emitter 1120. For example, controller 1110 may send data signals to emitter 1120 in order to power on and off the emitter. Additionally, controller 1110 may control the output power of emitter 1120. In some embodiments, controller 1110 may control multiple emitters 1120 (not shown) in the same additive manufacturing apparatus 1100. In some embodiments, emitter 1120 may additionally send data back to controller 1110. For example, emitter 1120 may send operational parameters such as power output, power use, temperature, and other operational parameters as are known in the art. The operational parameters of emitter 1120 may be used by controller 1110 to further control or optimize the processing of object 1150, for example, an object with supports at selected points according to the embodiments described herein.

Controller 1110 may also control scanner 1130. For example, controller 1110 may cause the selection, manipulation, articulation, engagement or other use of optical elements 1134. For example, controller 1110 may cause a focusing lens element to move in order to affect the size of a resulting beam 1136 or a size of a resulting beam spot 1138. Further, controller 1110 may cause a mirror or similar optical element to redirect resulting beam 1136 in different directions and onto different locations of object 1150. As yet another example, controller 1110 may cause a shutter or similar optical element to mask resulting beam 1136 even while emitter 1120 is active.

In some embodiments, controller 1110 may receive data back from scanner 1130. For example, scanner 1130 may send operational parameters such as power output, power use, temperature, beam size selection, beam power, beam direction, beam spot position, position of optical elements, condition of optical elements, and other operational parameters as are known in the art. The operational parameters of emitter 1120 may be used by controller 1110 to further control or optimize the processing of object 1150. In some embodiments, controller 1110 may be a part of scanner 1130.

Controller 1110 may also control platform 1140. For example, controller 1110 may cause platform 1140 to move in one or more dimensions (e.g. up and down or side to side). Controller 1110 may receive operational data from platform 1140, such as position, temperature, weight, proximity, and others as are known to persons of skill in the art. Controller 1110 may cause platform 1140 to move in increments of one layer of object 1150 at a time so that scanner 1130 can process a layer of material to add to object 1150. Layers of object 1150 may be defined in three-dimensional design drawings (e.g. 3D CAD) or in one or more two dimensional cross-sectional drawings (e.g. 2D CAD).

In some embodiments, controller 1110 may store or otherwise have access to object design data, such as 3D CAD drawings of an object to be manufactured by optical additive manufacturing apparatus 1100. For example, controller 1110 may be a part of a computer system that also includes object design software and hardware, such as CAD software. In this way, controller 1110 may have access to object design data in order to control emitter 1120, scanner 1130, and platform 1140 and to manufacture object 1150. In other embodiments, controller 1110 may be connected by a communication path to a repository, database, or the like of design data, such as database 1160 in FIG. 11. The object design data may comprise a design of an object with supports at selected points according to the embodiments described herein.

Figure 12:
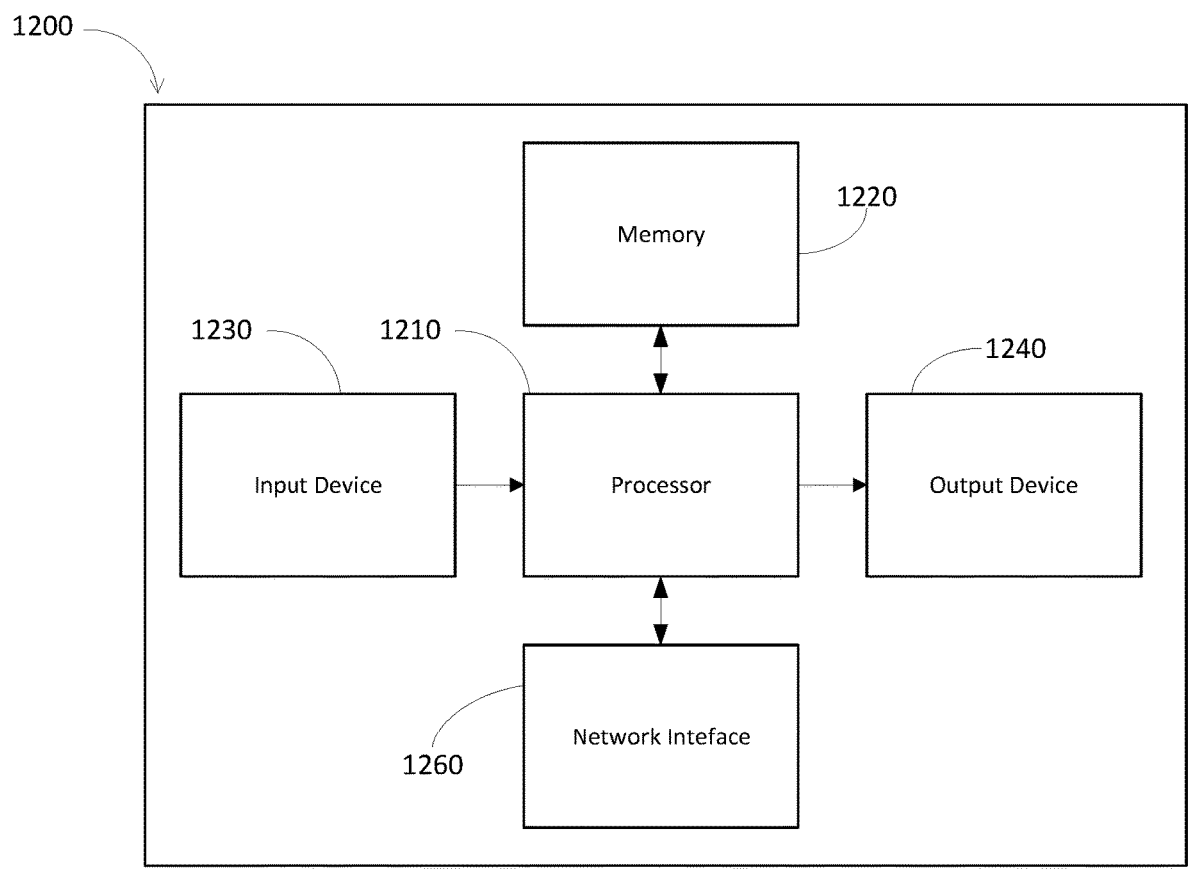
FIG. 12 depicts an exemplary computing device configured to perform the processes described herein.

In some embodiments, controller 1110 may receive design data of an object from, for example, computing device 1200 of FIG. 12. In this way, controller 1110 may direct the additive manufacturing of objects with supports according to the embodiments described herein.

Emitter 1120 may be, for example, a laser emitter, such as a diode laser, pulsed laser, or fiber layer, or other types of laser as are known by those of skill in the art. In some embodiments, the emitter 1120 may be an ultraviolet laser, carbon dioxide laser, or ytterbium laser. Emitter 1120 may be other types of irradiating emitters as known by those of skill in the art.

Emitter 1120 emits a beam, for example laser beam 1122, which is then processed by scanner 1130. Notably, while not shown in FIG. 11, optical elements such as mirrors, lenses, prisms, filters, etc., may be located between the emitter 1120 and scanner 1130.

In some embodiments, emitter 1120 may be a part of scanner 1130.

Scanner 1130 may include optical elements 1134. For example, optical elements may include lenses, mirrors, filters, splitters, prisms, diffusers, windows, displacers, and other elements as are known in the art. The optical elements 1134 may be fixed or moveable based on data received by scanner 1130 or controller 1110.

Scanner 1130 may also include sensors (not shown) that sense various operating parameters during operation of the scanner 1130. Generally speaking, the sensors may provide data feedback to the scanner 1130 and or controller 1110 in order to improve calibration and manufacturing performance of optical additive manufacturing apparatus 1100.

For example, scanner 1130 may include position sensors, heat sensors, proximity sensors, and the like. Additionally, scanner 1130 may include one or more image sensors. The image sensors could be used to provide visual feedback to an operator of optical additive manufacturing apparatus 1100. The image sensors could also be used, for example, to analyze the size, focus and position of the beam spot incident on the object being manufactured for calibration and precise tracking. Further, the image sensor may be sensitive to heat (e.g. a thermal image sensor) and be used to determine the state of the underlying material (e.g. resin) as it is being processed. For example, a thermal image sensor may measure the local heating around the beam spot and/or the level of curing of the material being processed.

Platform 1140 acts as a moveable base for the manufacture of object 1150, which may be custom footwear. As described above, platform 1140 may move in one or more directions and be controlled by a controller, such as controller 1110. For example, platform 1140 may be controlled by controller 1110 and moved one layer or cross-section of object 1150 at a time during the manufacture of object 1150.

Platform 1140 may include sensors that determine operational data and transmit that data to controller 1110 or to other parts of optical additive manufacturing apparatus 1100.

Platform 1140 may be enclosed by a container or vessel (not shown) containing manufacturing materials (e.g. photosensitive resin) that is processed by an incident beam spot directed by scanner 1130. For example, scanner 1130 may direct a beam over a layer of photosensitive resin, which causes the resin to cure and form a permanent layer of object 1150.

Platform 1140 may be made of any suitable material of adequate strength and resilience to serve as a manufacturing base for objects like object 1150.

In addition to a container or vessel around platform 1140, additive manufacturing apparatus 1100 may also include a manufacturing material dispensing element. For example, an element may dispense a new layer of manufacturing material after each respective layer of object 1150 is completed by the action of scanner 1130.

Object 1150 is formed by additive manufacturing apparatus 1100 using various methods, such as SLA, SLS, SLM and others as are known by those of skill in the art.

FIG. 12 depicts an exemplary computing device 1200, such as may be used to perform one or more of the processes described with respect to FIGS. 8-10 or other processes for manufacturing an object using supports according to one or more of the embodiments described herein.

The computing device 1200 includes a processor 1210. The processor 1210 is in data communication with various computer components. These components may include a memory 1220, an input device 1230, and an output device 1240. In certain embodiments, the processor may also communicate with a network interface card 1260. Although described separately, it is to be appreciated that functional blocks described with respect to the computing device 1200 need not be separate structural elements. For example, the processor 1210 and network interface card 1260 may be embodied in a single chip or board.

The processor 1210 may be a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

In some embodiments, the processor 1210 may be a specialized processor configured to perform one or more of the processes described with respect to FIGS. 8-10 or other processes for manufacturing an object using supports according to one or more of the embodiments described herein.

The processor 1210 may be coupled, via one or more data buses, to read information from or write information to memory 1220. The processor may additionally, or in the alternative, contain memory, such as processor registers. The memory 1220 may include processor cache, including a multi-level hierarchical cache in which different levels have different capacities and access speeds. The memory 1220 may further include random access memory (RAM), other volatile storage devices, or non-volatile storage devices. The storage can include hard drives, optical discs, such as compact discs (CDs) or digital video discs (DVDs), flash memory, floppy discs, magnetic tape, Zip drives, USB drives, and others as are known in the art.

The processes described with respect to one or more of FIGS. 8-10 or other processes manufacturing an object using supports according to one or more of the embodiments described herein may be stored as a set of instructions in the memory 1220 and when executed by the processor, cause the processor to perform the process.

The processor 1210 may also be coupled to an input device 1230 and an output device 1240 for, respectively, receiving input from and providing output to a user of the computing device 1200. Suitable input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to a computing device. The input device may also take the form of a touch-screen associated with the display, in which case a user responds to prompts on the display by touching the screen. The user may enter textual information through the input device such as the keyboard or the touch-screen. Suitable output devices include, but are not limited to, visual output devices, including displays and printers, audio output devices, including speakers, headphones, earphones, and alarms, additive manufacturing devices, and haptic output devices.

The processor 1210 further may be coupled to a network interface card 1260. The network interface card 1260 prepares data generated by the processor 1210 for transmission via a network according to one or more data transmission protocols. The network interface card 1260 may also be configured to decode data received via the network. In some embodiments, the network interface card 1260 may include a transmitter, receiver, or both. Depending on the specific embodiment, the transmitter and receiver can be a single integrated component, or they may be two separate components. The network interface card 1260, may be embodied as a general purpose processor, a DSP, an ASIC, a FPGA, or other programmable logic device, discrete gate or transistor logic, discrete hardware components, or any suitable combination thereof designed to perform the functions described herein.

The invention disclosed herein may be implemented as a method, apparatus, or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, FPGAs, ASICs, complex programmable logic devices (CPLDs), programmable logic arrays (PLAs), microprocessors, or other similar processing devices.

It will be appreciated by persons skilled in the art that numerous variations and/or modifications may be made to the invention without departing from the spirit or the scope of the invention as broadly described. The above described embodiments are, therefore, to be considered in all respects as illustrative and not restrictive.

What is claimed is:

1. A method of manufacturing an object using additive manufacturing techniques, the method comprising:
   providing a base plate comprising a body portion and an insert, wherein the insert comprises a torque application portion and a shaft portion, wherein the body portion includes at least one opening configured to receive the shaft portion;
   positioning an end of the insert in a first xy plane;
   using additive manufacturing techniques to build a support, wherein the support is configured to at least partially support the object during additive manufacturing, and wherein the support is built on top of the insert, contacting only a top surface of the insert; and
   using additive manufacturing techniques to build the object.

2. The method of claim 1, wherein the torque application portion and the shaft portion are formed as a single, joined component.

3. The method of claim 1, wherein the at least one opening is configured to allow the shaft portion to rotate within the at least one opening.

4. The method of claim 3, wherein the shaft portion comprises threads formed on an external surface, and wherein the at least one opening comprises complimentary threads on an internal surface.

5. The method of claim 4, wherein the shaft portion is configured to be screwed into the at least one opening to engage the insert with the body portion.

6. The method of claim 1, wherein the body portion further comprises a cut-out along a same axis as a center of the at least one opening.

7. The method of claim 6, wherein the cut-out has a diameter sufficient to fit the torque application portion within the cut-out.

8. The method of claim 7, wherein a diameter of the cut-out is further sufficient to allow a tool to interact with the torque application portion.

9. The method of claim 1, wherein the body portion and the insert are configured for positioning within an additive manufacturing device, and wherein the additive manufacturing device is configured to build the support above a portion of the insert that is exposed on top of the base plate.

10. The method of claim 1, further comprising applying torque to the torque application portion in order to break the insert from the support.

11. The method of claim 10, wherein the insert is configured to break from the support at the portion of the insert that is exposed on top of the base plate.

12. The method of claim 1, wherein the support is configured to at least partially support the object by providing at least one of a heat sink function, a distortion prevention function, and a horizontal support function.

13. The method of claim 1, further comprising building the support and object as part of a single additive manufacturing process.

14. The method of claim 1, wherein the first xy plane is a plane where additive manufacture of the object begins.

15. The method of claim 1, further comprising providing on the base plate a first portion of a coupling element, the coupling element comprising the first portion of the coupling element and a second portion of the coupling element, wherein the first portion of the coupling element is configured to detachably couple to the second portion of the coupling element.

16. A method of manufacturing an object using additive manufacturing techniques, the method comprising:
- providing a support for the object, the support being configured to at least partially support the object during additive manufacture of the object;
- providing a base plate, wherein the support is configured to couple at a first end with a first portion of the object and to couple at a second end with one of a second portion of the object, the base plate, and another object;
- providing, on the support, a first portion of a coupling element, the coupling element comprising the first portion of the coupling element and a second portion of the coupling element, wherein the first portion of the coupling element is configured to detachably couple to the second portion of the coupling element;
- providing, on at least one of the support, the object, the other object, and the base plate, the second portion of the coupling element,
- wherein the coupling element comprises a sliding coupling element configured to slide in a horizontal plane with respect to a build direction of the object, wherein the sliding coupling element comprises a receiving element that slides with respect to a sliding element, the sliding element and receiving element having complimentary shapes that prevent movement in a vertical direction with respect to the build direction of the object when the sliding element and the receiving element are engaged; and
- sliding the sliding element out of the receiving element to disengage the first portion of the object from the one of the second portion of the object, the base plate, and the other object.

17. The method of claim 16, wherein the sliding element comprises a plurality of separate blocks.

18. The method of claim 16, wherein the sliding element is configured to rotationally slide with respect to the receiving element.

19. The method of claim 16, wherein the sliding element is configured to rectilinearly slide with respect to the receiving element.

20. A method of manufacturing an object using additive manufacturing techniques, the method comprising:
- controlling of building, using additive manufacturing, a support at a position above a portion of an insert that is exposed on top of a base plate comprising a body portion and the insert, wherein the insert comprises a torque application portion and a shaft portion, wherein the body portion includes at least one opening configured to receive the shaft portion, and
- controlling of building the object on top of the support to a least partially support the object during additive manufacturing, and wherein the support is built on top of the insert, contacting only a top surface of the insert.

21. A method of manufacturing an object using additive manufacturing techniques, the method comprising:
- controlling building, using additive manufacturing, a support for the object, the support being configured to at least partially support the object during additive manufacture of the object, wherein the support is configured to couple at a first end with a first portion of the object and to couple at a second end with one of a second portion of the object, a base plate, and another object, wherein a first portion of a coupling element is provided on the support, the coupling element comprising the first portion of the coupling element and a second portion of the coupling element, wherein the first portion of the coupling element is configured to detachably couple to the second portion of the coupling element, wherein the second portion of the coupling element is provided on at least one of the support, the object, the other object, and the base plate, wherein the coupling element comprises a sliding coupling element configured to slide in a horizontal plane with respect to a build direction of the object, wherein the sliding coupling element comprises a receiving element that slides with respect to a sliding element, the sliding element and receiving element having complementary shapes that prevent movement in a vertical direction with respect to the build direction of the object when the sliding element and the receiving element are engaged;
- controlling of building the object on top of the support to a least partially support the object during additive manufacturing; and
- sliding the sliding element out of the receiving element to disengage the first portion of the object from the one of the second portion of the object, the base plate, and the other object.

* * * * *